US011979379B2

(12) United States Patent
Nosalis et al.

(10) Patent No.: US 11,979,379 B2
(45) Date of Patent: May 7, 2024

(54) SYSTEM AND METHOD FOR RETRIEVING AGGREGATED INFORMATION ABOUT VIRTUAL PRIVATE NETWORK SERVERS

(71) Applicant: Oversec, UAB, Vilnius (LT)

(72) Inventors: Adomas Nosalis, Vilnius (LT); Darjus Ilcevic, Vilnius (LT)

(73) Assignee: Oversec, UAB, Vilnius (LT)

(*) Notice: Subject to any disclaimer, the term of this patent is extended or adjusted under 35 U.S.C. 154(b) by 22 days.

(21) Appl. No.: 17/826,197

(22) Filed: May 27, 2022

(65) Prior Publication Data
US 2023/0104116 A1 Apr. 6, 2023

Related U.S. Application Data

(63) Continuation of application No. 17/491,549, filed on Oct. 1, 2021, now Pat. No. 11,356,419.

(51) Int. Cl.
*G06F 21/60* (2013.01)
*G06F 9/54* (2006.01)
(Continued)

(52) U.S. Cl.
CPC .......... *H04L 63/0272* (2013.01); *G06F 9/547* (2013.01); *H04L 12/4641* (2013.01); *H04L 67/141* (2013.01)

(58) Field of Classification Search
None
See application file for complete search history.

(56) References Cited

U.S. PATENT DOCUMENTS

| 6,597,684 B1* | 7/2003 | Gulati ................ H04L 47/822 370/351 |
| 2008/0046995 A1* | 2/2008 | Satterlee ............ H04L 67/1008 726/15 |

(Continued)

FOREIGN PATENT DOCUMENTS

CN 102158393 A * 8/2011 ......... H04L 12/4641

OTHER PUBLICATIONS

VPN Traffic Detection in SSL-Protected Channel. Abideen. Wiley. (Year: 2019).*

(Continued)

*Primary Examiner* — Venkat Perungavoor
(74) *Attorney, Agent, or Firm* — Meunier Carlin & Curfman LLC

(57) ABSTRACT

A method and system to communicate VPN server information to a client application without providing a full list of VPN server IP addresses. Instead, the method includes VPN server selection criteria that can be requested by client applications, such as "Free or Premium servers", "Geolocation", "Load", "Streaming and protocol capabilities", etc. A tagged data payload (e.g., JSON) can be used to provide these criteria, upon a request by a client application. Various groupings of VPN servers can be represented by the above criteria. The method provides a means for communicating the available VPN servers to a client application without sending and revealing the full list of VPN servers stored in the VPN infrastructure. This makes the VPN server selection efficient, reduces network load and VPN tunnel establishing time, also, ensures confidentiality of VPN server lists that is important for any of VPN service providers and users.

20 Claims, 8 Drawing Sheets

(51) Int. Cl.
  *H04L 9/40* (2022.01)
  *H04L 12/46* (2006.01)
  *H04L 67/141* (2022.01)
  *G06F 21/71* (2013.01)

(56) References Cited

U.S. PATENT DOCUMENTS

| | | | | |
|---|---|---|---|---|
| 2010/0309920 A1* | 12/2010 | Rosenberg | ............ | H04L 45/021 370/395.53 |
| 2014/0136597 A1* | 5/2014 | Bland | ................ | H04L 12/4641 709/203 |
| 2017/0359311 A1* | 12/2017 | Chen | ................... | H04L 63/0823 |
| 2017/0359380 A1* | 12/2017 | Chen | ..................... | H04L 63/083 |

OTHER PUBLICATIONS

Cloud-based Data Center Design as an Data Storage Infrastructure on Internet of Things. Primananda. JITECS. (Year: 2019).*

* cited by examiner

| ATTRIBUTES \ SERVERS | Location A | | | | Location B | | | Location C |
|---|---|---|---|---|---|---|---|---|
| | P1 | P2 | P3 | P4 | P5 | P6 | P7 | P8 |
| Type: Free / Premium | Free | Free | Free | Free | Free | Free | Free | Free |
| Load: < / > 10Mbps | <10Mbps | <10Mbps | <10Mbps | <10Mbps | <10Mbps | <10Mbps | <10Mbps | <10Mbps |

Groups of VPN servers formed - 2: {*Free*} and {*<10Mbps*}

FIGURE 4 A

| ATTRIBUTES \ SERVERS | Location A | | | | Location B | | | Location C |
|---|---|---|---|---|---|---|---|---|
| | P1 | P2 | P3 | P4 | P5 | P6 | P7 | P8 |
| Type: Free / Premium | Free | Free | Free | Free | Free | Free | Free | Free |
| Load: < / > 10Mbps | <10Mbps | <10Mbps | <10Mbps | <10Mbps | <10Mbps | <10Mbps | <10Mbps | <10Mbps |
| Protocol: L2TP/IPSec | | | IPSec | IPSec | | IPSec | | |

Groups of VPN servers formed - 3: {*Free*} and {*<10Mbps*} and {*IPSec*}

FIGURE 4 B

| | LOCATIONS | | | | | | | |
|---|---|---|---|---|---|---|---|---|
| | Location A | | | | Location B | | | Location C |
| SERVERS | P1 | P2 | P3 | P4 | P5 | P6 | P7 | P8 |
| ATTRIBUTES | | | | | | | | |
| Type: Free / Premium | Free | Free | Free | Free | Free | Free | Free | Free |
| Load: < / > 10Mbps | <10Mbps | <10Mbps | <10Mbps | <10Mbps | <10Mbps | <10Mbps | <10Mbps | >10Mbps |
| Protocol: L2TP/IPSec | | | IPSec | IPSec | | IPSec | | |

Groups of VPN servers formed - 4: {*Free*} and {*<10Mbps*} and {*IPSec*} and {*>10Mbps*}

FIGURE 4 C

| | LOCATIONS | | | | | | | |
|---|---|---|---|---|---|---|---|---|
| | Location A | | | | Location B | | | Location C |
| SERVERS | P1 | P2 | P3 | P4 | P5 | P6 | P7 | P8 |
| ATTRIBUTES | | | | | | | | |
| Type: Free / Premium | Free | Premium | Premium | Premium | Free | Premium | Premium | Free |
| Load: < / > 10Mbps | <10Mbps | <10Mbps | >10Mbps | <10Mbps | <10Mbps | <10Mbps | <10Mbps | >10Mbps |
| Protocol: L2TP/IPSec | | | IPSec | IPSec | | IPSec | | |

Groups of VPN servers formed - 5: {*Free*} and {*<10Mbps*} and {*IPSec*} and {*>10Mbps*} and {*Premium*}

FIGURE 4 D

SYSTEM AND METHOD FOR RETRIEVING AGGREGATED INFORMATION ABOUT VIRTUAL PRIVATE NETWORK SERVERS

CROSS REFERENCE TO RELATED APPLICATIONS

The present application is a continuation of U.S. application Ser. No. 17/491,549 filed on Oct. 1, 2021.

FIELD OF INVENTION

The present invention relates generally to Virtual Private Networks (VPN), and more particularly to aggregating and retrieving VPN service-specific attributes from a plurality of available VPN servers.

BACKGROUND OF INVENTION

Global Internet users increasingly rely on virtual private network (VPN) services to preserve their privacy, circumvent censorship, and access geo-filtered content. Originally developed as a technology to privately send and receive data across public networks, VPNs are now used broadly as a privacy-preserving technology that allows internet users to obscure not only their traffic but also their personal information, such as their browsing history from third parties including internet service providers (ISPs) and spywares, etc. A VPN service provider offers a secure, private networking environment within a shared public infrastructure through encapsulation and encryption of all traffic from the VPN application within the VPN user's device to the remote access VPN server.

A typical VPN service consists of a network of servers, typically spread across several geographical locations. A VPN server is a physical or a virtual server that is configured to host and deliver VPN services to users worldwide. The server is a combination of hardware components, and a VPN server usually has several logical and physical communication ports. The VPN client application connects with a VPN server and relays the user's traffic through an encrypted tunnel. After receiving the encrypted traffic, the VPN server will decrypt and forward the traffic to the designated web server. As soon as the web server sends the requested data, the VPN server receives and encrypts the data before sending it to the user. The VPN client application then decrypts the data for the user's view.

VPN client applications are software-based technologies that establish a secure connection between a user and a VPN server. Some VPN client applications work in the background of the user's device automatically, while others have front-end interfaces that allow users to interact with and configure the application. VPN client applications are often installed on a computer, though some organizations provide a purpose-built VPN client application that is a hardware device pre-installed with VPN software. Generally, VPN client applications operate on more than one VPN protocol to encrypt and decrypt the data. Some of the commonly used VPN protocols are OpenVPN, SSTP, PPTP, L2TP/IPSec, IKEv2, SoftEther.

Most of the VPN services allow users to select or switch between different servers in the private network according to the user's choice of location or other requirements. For instance, if a user wants to connect to a VPN server that is located in the US, the user can simply choose the location through the graphical user interface and the connection will be instantly established to the US server. It is also the same when the user wants to switch to a different server in that particular country. The existence of multiple servers in a VPN service network makes it possible for users to choose the location of servers. In addition, a user can select a server that is optimized for the particular service: protocol capabilities (online content streaming), low load, stable connection, etc. Without this provision of choice, users generally will be assigned random servers without the ability to choose the servers with certain parameters that they want. The more VPN servers a VPN service provides, the better it is for the users. This is because the users have more servers to choose from, and they can access even the remotest websites that are only available in certain countries.

The number of active VPN servers, however, reaches thousands worldwide. This makes it impossible for a user to select manually and quickly an optimal VPN server for her needs. A straightforward solution can be an IT infrastructure and VPN service which collects and maintains up-to-date lists of VPN servers available over the Internet and their IP addresses. The IT infrastructure polls VPN servers to check activity, accepts requests, registers new VPN servers, maintains up-to-date IP lists, and provides the IP address lists to VPN users.

However, as the number of available VPN servers increases, several problems arise. First, a list of VPN servers contains the IP address, location, and other metadata for each entry, resulting in a list that can be several or tens of megabytes. The large, variable data load can congest networks, causing delays when transferring these lists to end-users as well as requiring significant amount of mobile data usage when not accessing the internet through a ground cable or Wi-Fi connection. Second, selecting an optimal VPN server from a list of thousands is complicated. The VPN server selection process becomes prohibitively complex for a user as the number of available servers increases, often providing more information than the user can use to make a selection. Finally, VPN service providers, gateway providers, and end-users may often prefer that lists of VPN server IP addresses are confidential or hidden from actors outside of the VPN service.

To date, there is not a single technological solution for all the above problems. The instant application provides a system and method that lowers the latency to send server information to end-users within a VPN infrastructure while providing tailored server information specific to the end-user and obfuscating the available VPN server IP addresses.

SUMMARY OF INVENTION

The present invention discloses a system and method of identifying and servicing a client application request for a VPN server through aggregating information of a plurality of VPN servers. In one aspect, this invention gathers data, analyzes, and determines attributes related to multiple VPN servers available in a VPN service provider's infrastructure. VPN servers are grouped and indexed according to their service attributes. These indexed attributes allow a user to specify and select preferred VPN servers to provide VPN service to the client application.

Further, the method provides a payload to the client application containing selected attributes for VPN server selection. In the client application, the user will see whether there is at least one server matching a selected set of criteria or if there are servers matching a related set of criteria. The VPN service provider infrastructure does not send any lists of servers or their associated IP address to the user device. The user chooses to connect to the one or more servers having a certain set of criteria, then the VPN service provider infrastructure connects the user device to a server within the selected group. The selected VPN server is used for VPN tunneling.

The invention comprises VPN service provider infrastructure aggregating and retrieving VPN server information from a server database containing a list of a plurality of VPN servers. A processing unit dynamically processes and indexes VPN server attributes. The processing unit is also configured to gather multiple server conditions for computing VPN server suitability to provide VPN service. Some examples of such gathered information are server location, free or premium type, current load, bandwidth, server creation time, server IDs, etc. Moreover, the system is configured to periodically measure these conditions and update indexed VPN server lists with the aggregated information of each VPN server in the list.

VPN services where this system and method can be employed may be various VPN services, including but not restricted to remote access, site-to-site, etc. The VPN tunneling protocols can include but are not limited to PPTP, SSTP, L2TP/IPSec, OpenVPN, SSTP, IKEv2, SSL/TLS, Wireguard.

BRIEF DESCRIPTION OF DRAWINGS

FIG. 4 depicts VPN server grouping examples: A) all servers in all locations have two attributes with same values; B) grouping of a heterogeneous server pool; C) grouping of another heterogeneous server pool; D) grouping of a disjunct server pool.

DETAILED DESCRIPTION

Figure 1:
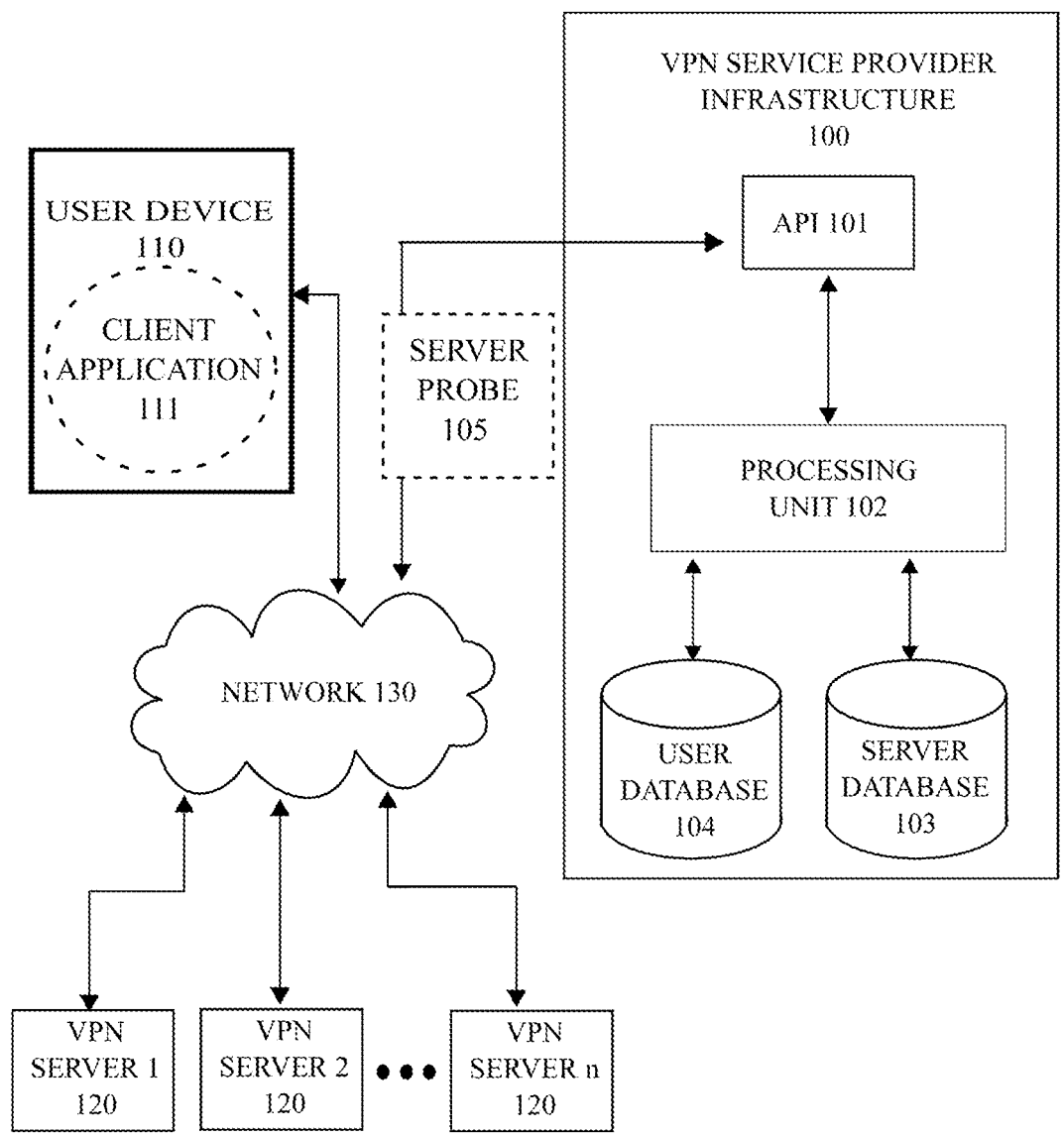
FIG. 1 shows a block diagram of an exemplary architectural depiction of system components.

Some general terminology descriptions may be helpful and are included herein for convenience and should be interpreted in the broadest possible interpretation. Elements that are not imperatively defined in the description should have the meaning as would be understood by the person skilled in the art.

A user device 110 can be any computing device capable of hosting a VPN client application 111. It can comprise any physical device that is connected to a network, including, for example, a laptop, a mobile phone, a tablet computer, a desktop computer, a smart device, a router, or other network devices. The user device 110 can also be a device that is capable of network connectivity, but not primarily intended for networking, such as connected home appliances, smart home security systems, autonomous farming equipment, wearable health monitors, smart factory equipment, wireless inventory trackers, biometric cyber security scanners, and others.

The VPN client application 111 installed locally or is remotely accessed from a web-based service, launched locally or remotely. The VPN client application 111, is a software-based technology that establishes a secure connection between the user device 110 and a VPN server 120. VPN client applications can include a front-end interface that allows the user device 110 to configure and interact with it.

VPN service provider infrastructure 100, hereafter SPI, is a combination of hardware and software that provides functionality for multiple client applications 111 via a network 130. The SPI 100 can receive from the client application 111 a request to establish a VPN connection. The SPI 100 also contains databases, which will persistently store and contain all of the data necessary for servicing the client application 111. The SPI 100 can be a combination of physical devices, virtual machines/servers, or can be located on the cloud.

An application programming interface, API 101, is a programming interface consisting of one or more endpoints to a defined request-response message system. In the present system, API 101 enables the communication between the client application 111 and VPN SPI 100.

Processing unit 102 is a logical component configured to perform complex operations of collecting payloads of VPN servers, aggregating information, and providing the aggregated information upon request from the client application 111. Processing unit 102 may also contain an internal storage unit at its disposal and can be a combination of hardware and software.

Server database 103 is a component of the SPI 100 and is a storage unit for storing server conditions collected by a server probe. Server conditions can include but are not limited to location, load, time of creation, server IDs, etc. of a plurality of VPN servers 120. The server database 103 can be a combination of hardware and software or a cloud-based system that offers a database management system.

User database 104 is a component of the SPI 100 and is a structured repository of authentication credentials belonging to the owners of multiple user devices 110.

The server database 103 and the user database 104 can be conventional databases offered by MySQL, MSSQL, NoSQL, object-oriented databases, or any other type or category of databases. Data storage-wise, the server database 103 can also be data storage within the memory of a computing device or within a cloud. The server database 103 is responsible for storing, organizing, and returning data related to the plurality of VPN servers 120. Similarly, the user database 104 is responsible for storing and returning authentication credentials of the client application 111 accessing the VPN SPI 100. Information regarding the plurality of VPN servers 120 is stored in the server database 103 for the purpose of aggregating and retrieving information related to the plurality of VPN servers.

A server probe 105 is a processing unit that gathers information, known as the server conditions about the plurality of VPN servers 120. The server probe is capable of performing tests against individual VPN servers 120 in order to gather information related to speed, load, round-trip time, etc. The server probe 105 can be a router, server, or other communication device or software item, such as a software agent or messenger, within the SPI 100, on the network 130, or joined with a VPN server 120 which has processing capabilities to request, send, and receive information from VPN servers.

VPN servers 120; VPN server 1; VPN server 2; VPN server n 120 are exemplary instances of the plurality of VPN servers. The number of servers in the plurality of VPN servers 120 is not limited. A VPN server is a physical or virtual server that is provisioned to host and deliver VPN services to multiple client applications 111 worldwide. Each of the servers in the plurality of VPN servers 120 is a combination of VPN hardware and VPN software that allows a client application 111 installed on the user device 110 to connect to a secure private network. VPN servers 120 usually contain multiple logical and physical communication ports.

Network 130 can be any digital telecommunication network that permits several nodes to share and access resources, e.g., local-area network (LAN), wide-area networks (WANs), campus-area networks (CANs), metropolitan-area networks (MANs), home-area networks (HANs), Intranet, Extranet, or Internetwork.

FIG. 1 shows an exemplary overall architecture of the preferred embodiment that comprises user device 110, the SPI 100, and a plurality of VPN servers 120. All the components of the system have access to the network 130 and are able to interact with each other through the same. The SPI 100 consists of the following components: API 101, user database 104, the processing unit 102, the server probe 105, and server database 103. VPN server 1 120, VPN server 2 120, and VPN server n 120 represent the plurality of VPN servers present in the VPN network. While the elements shown in FIG. 1 implement the preferred embodiment, some elements in other embodiments can have different titles or can be combined into a single element instead of two separate elements. However, the functionality of elements and the flow of information between the elements are not impacted generally by such consolidations or combinations. Therefore, FIG. 1 as shown should be exemplary only and not restrictive or exclusionary of other features, including features discussed in other areas of this disclosure here within.

In FIG. 1, all occurrences of communication between the user device 110, SPI 100, and the plurality of VPN servers 120 occur through the network 130. The instances of communication between user device 110 and the SPI 100 include but are not limited to authentication, authorization, data exchange, etc. The communication instances between user device 110 and the plurality of VPN servers 120 can happen through an encrypted tunneling protocol provided by the client application 111 installed or accessed remotely on the user device 110. The tunneling protocols can include but are not limited to PPTP, SSTP, L2TP/IPSec, OpenVPN, SSTP, IKEv2, SSL/TLS, Wireguard.

With reference to FIG. 1, the API 101 can receive a request from the client application 111 via the network 130, and the request can be either an authentication request or a request for indexed VPN server information to establish a VPN connection. Initially, when the client application 111 approaches the SPI 100, the first request is usually an authentication request. Valid credentials are provided by the client application 111 for the purpose of authentication, which is then verified by the API 101 by accessing the user database 10. The API 101 queries the user database 104 for verifying the credentials provided by the client application 111 against the data present in the user database 104. Once the credentials are validated, the API 101 authenticates and authorizes the client application 111.

The request by the client application 111 to the SPI 100 for indexed VPN server information to further establish a VPN connection prompts the API 101 to query the processing unit 104 for an indexed VPN server list. The processing unit 104 provides a payload containing temporary server IDs, server locations, and server groups while specific identifying information about each server and the total number and distribution of servers is not sent to the client application 111.

Figure 2A:
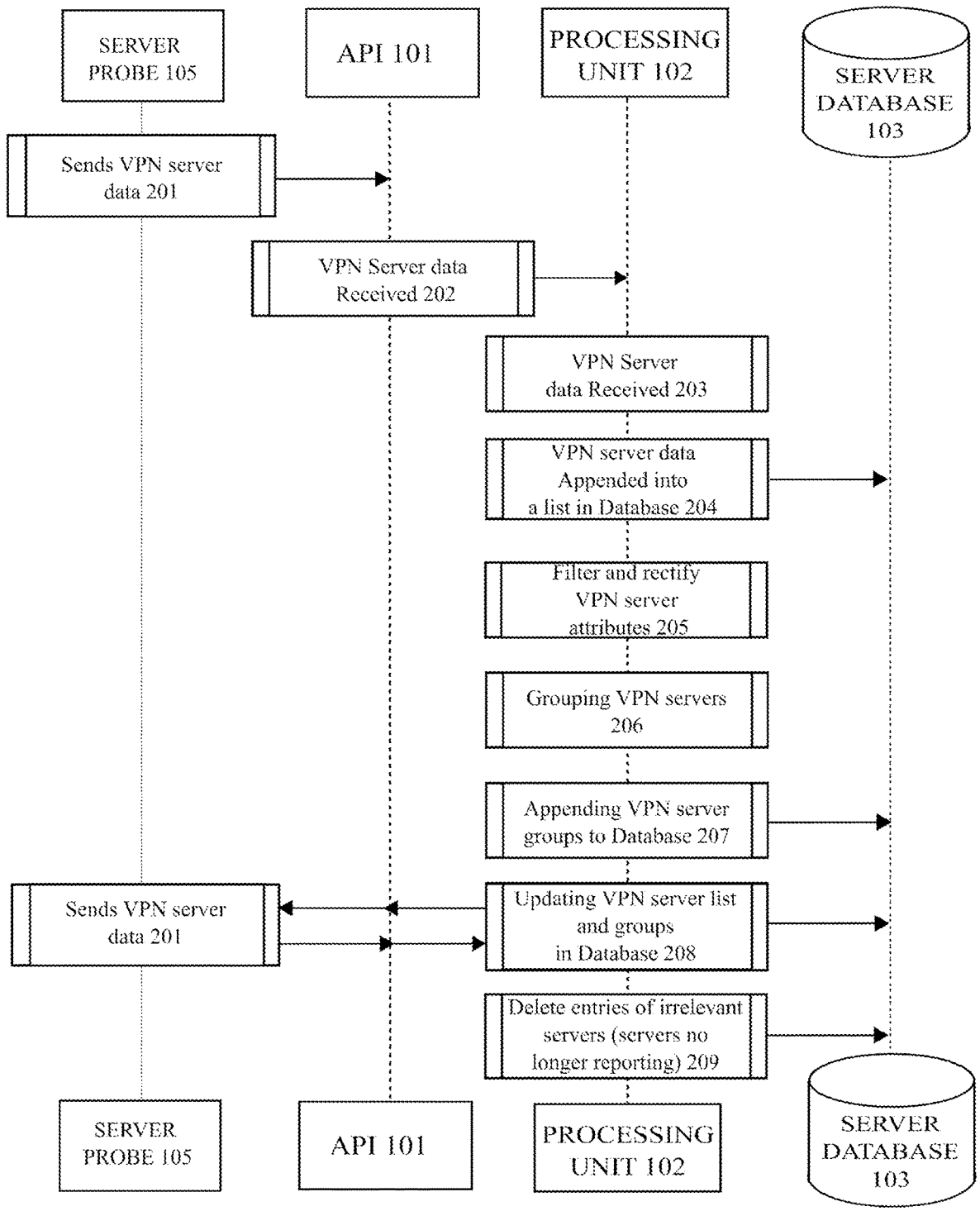
FIG. 2A shows an exemplary flow diagram of the operations of collecting and aggregating information about a plurality of VPN servers.

An exemplary embodiment of the invention includes a method to collect, aggregate, and index identifying service-related attributes about the plurality of VPN servers 120 within the SPI 100 as shown in FIG. 2A, so that a periodically updated server database 103 is maintained prior to a client application's 111 request for indexed VPN server information. In this embodiment, the server probe 105 receives a set of monitoring data from each server and requests or probes the server for other monitoring information such as server load, latency, and speed. The server probe 105 sends all monitoring data to the processing unit via the API 101 (step 201, 202, 203). Collecting and transforming of server data can be executed at prescribed time intervals for all of or a portion of all available VPN servers. When the processing unit accepts a new payload, the processing unit validates that each VPN server can be accessed through the network. All validated server payloads are aggregated with previous payloads to form a VPN server list that is stored in the server database (step 204).

The server probe 105 reporting (step 201) may be done from each VPN server 120 or by VPN service provider infrastructure 100 which polls the recorded list of VPN servers 120. The reporting (step 201) by the server probe 105 may be initiated from a VPN server 120, requested by the VPN SPI 100, or supported by a duplex communication, which should be understood as arbitrary two-directional communication arrangement wherein requests and transfers are initiated from both the server probe 105 and SPI 100. For example, SPI 100 requests a server probe for an initial VPN server payload, and the server probe transfer it in response. Afterwards, the subsequent, updated payloads are sent periodically, being initiated by the server probe 105 itself. In some cases, the SPI's 100 request may include the list of a VPN server's required parameters which the SPI 100 requests to receive from the server probe 105, in this case, the VPN server's parameter filtering function may be partially implemented even during the VPN server's data collecting stage.

The VPN server's data is provided (steps 201, 202, 203) as a payload by the server probe 105 to server database 103 in a structured data format. The structured data format can be a tagged text structure, e.g., JSON or any other format suitable for transferring network-monitoring messages, for example, Simple Network Management Protocol (SNMP) messaging formats.

The VPN server list in the server database 103 may comprise all recorded data such as server names, IP addresses, geographic location, country, city, or service attributes such as speed, throughput, delay, latency, QoS parameters, Premium or Free type, etc. Nevertheless, the VPN server list may be filtered, rectified, or reduced by extracting relevant attributes, filling undefined values thereof, or removing non-relevant attributes (step 205). The VPN server list can be collected and recorded into the server database 103 in different ways. In one example, a VPN server 120 can itself provide its full metadata including all required attributes. In another example, a VPN server may provide only its IP address, and then the server probe 105 collects its attributes. The server probe verifies and tests the VPN connection bandwidth, delay, and other important VPN service attributes.

The exemplary embodiment is further carried out by indexing each VPN server according to location and groupings related to VPN server attributes by the processing unit 102 (step 206). This and the following steps, when carried out, produce an indexed VPN server list, which can be queried by the API. The groupings can be defined in advance according to information gathered from the VPN servers and are aggregated with all known and relevant groupings that are stored in the server database 103 thereby forming a grouping payload (step 207). Once a grouping payload is formed, it is sent back to the server database 103 and is aggregated with the indexed VPN server list. These processes may be repeated each time the server probe retrieves a server payload (step 208). If a VPN server is no longer reporting to the server probe, its related entries may be removed from the VPN server list in the server database 103 (step 209).

The grouping payload comprises metadata, such as temporary server identification numbers, locations, and attribute groupings together with server IDs associated with each location and grouping. Indexing all possible attribute groups enables all attributes to be available for requesting and selection of a subset of attribute groups and locations by the client application 111.

In one embodiment, the client application 111 selects a type of activity to be done through VPN, such as streaming videos, video gaming, accessing geo-specific content, or other activities whereby a pre-defined set of attributes are suggested for filtering through an indexed VPN server list. In another embodiment, the client manually selects criteria of a VPN server for filtering from the indexed VPN server list. For example, grouping and selection may be limited to only "premium", "bandwidth", and "protocol" attributes, which will be shown at the client application 111 user interface. A known problem in string-based grouping is that different VPN servers can provide their payloads with different names of the same attribute, e.g., "bandwidth", "bandw" and "bwth". If these names were considered as different attributes, then three VPN server groups would be created for the same feature "bandwidth". So, it is important to unify names for the same attribute using known methods in the art.

Figure 2B:
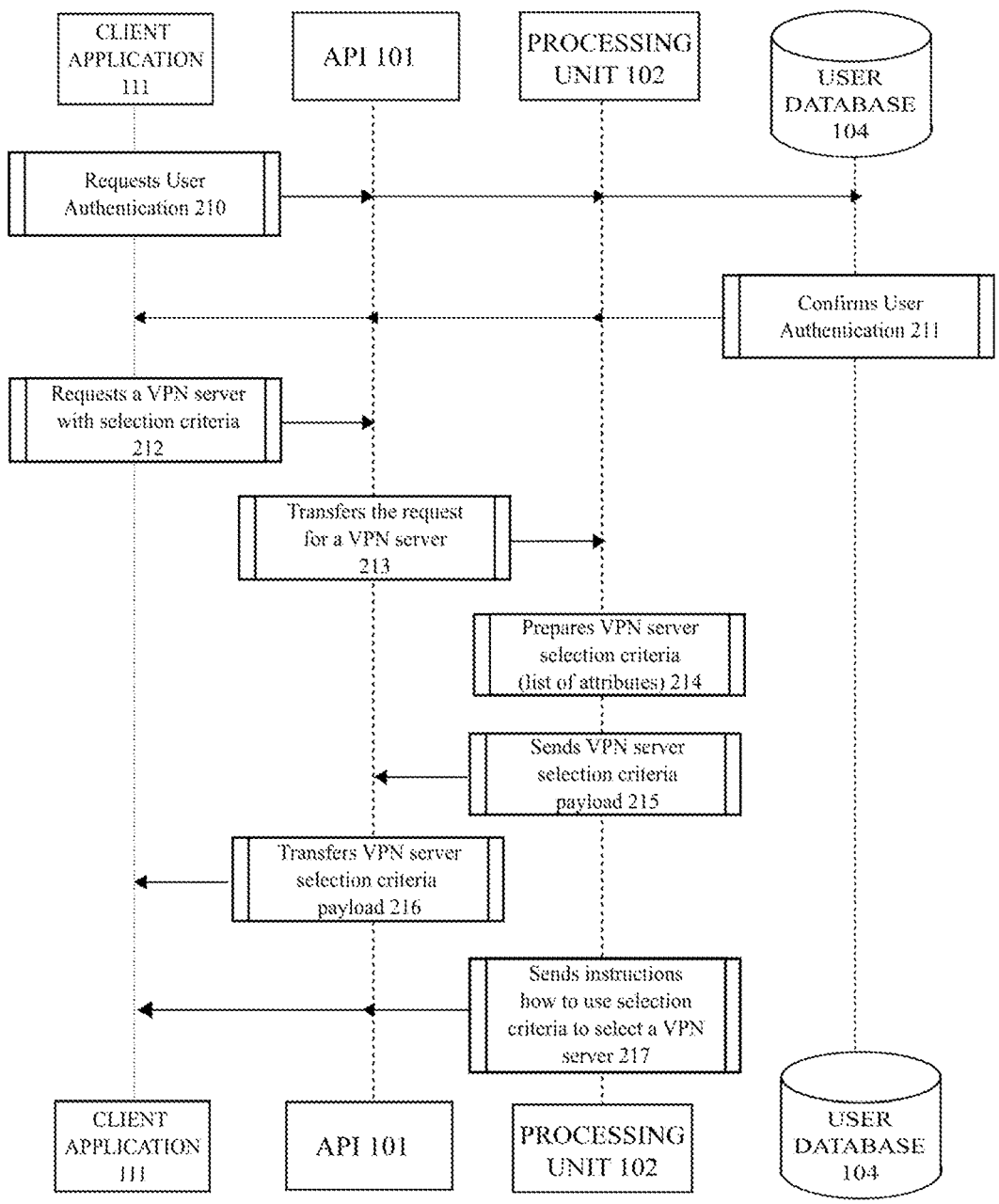
FIG. 2B is a continuation diagram showing an exemplary flow diagram of the operations of collecting and aggregating information about a plurality of VPN servers.

In a preferred embodiment as shown in FIG. 2B, the client application 111 will connect to the VPN infrastructure after a series of authentication and authorization steps (210, 211). After user authentication is successful, the client application 111 can send a request to the API 101 for a VPN server with selected criteria of attributes and location(s) (step 212). This information is provided as a structured payload (e.g., JSON file), which lists attribute groups and locations (steps 213-216). The VPN server group payload is a structured data format, such as JSON, BSON, YAML, XML, HTML or any human friendly data tagging and serialization standard. Additionally, the SPI 100 may send to the client application 111 some readable or machine-scripted instructions (e.g., an applet) about how to use the structured JSON payload comprising said VPN server group payload (step 217).

Figure 2C:
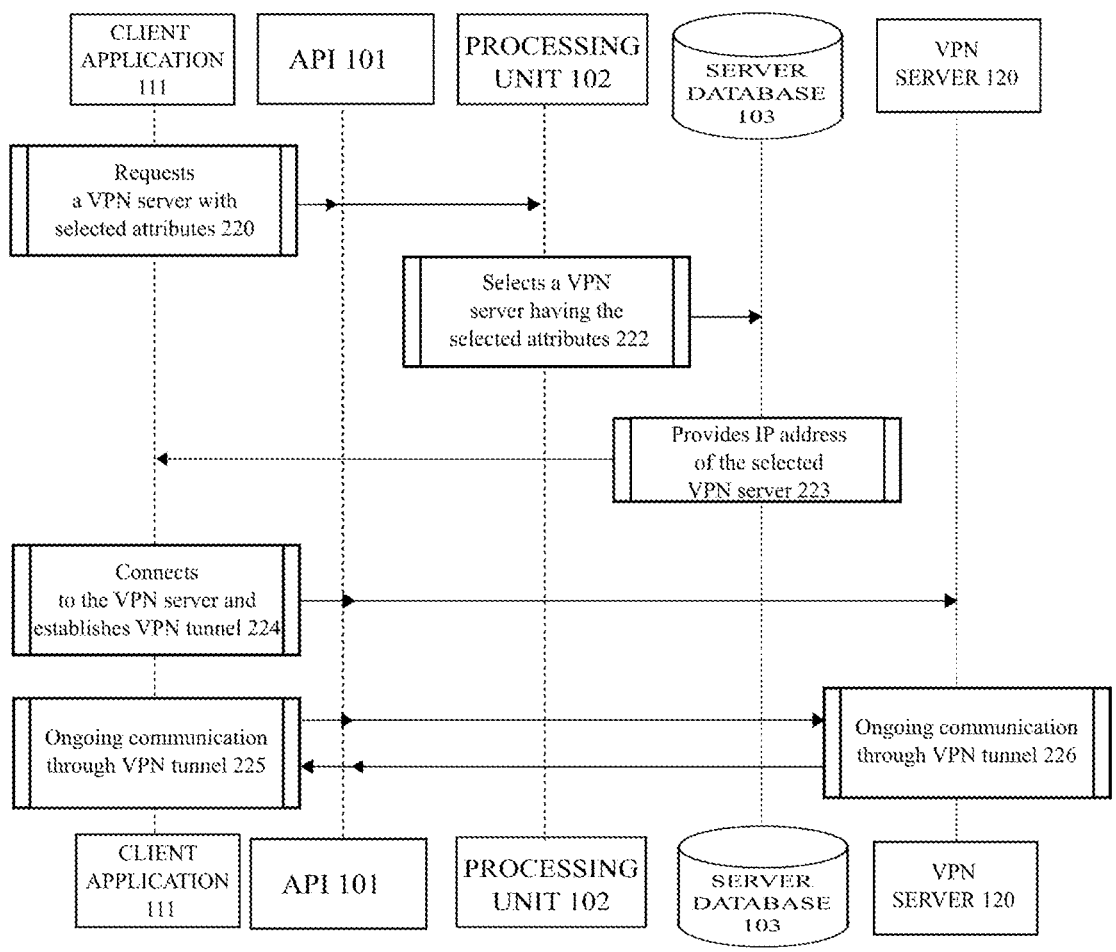
FIG. 2C is a continuation diagram showing the operations of collecting and aggregating information about a plurality of VPN servers and connecting a user device to an optimal VPN server.

In a preferred embodiment as shown in FIG. 2C, the client application 111 selects a set of criteria representing a server that can be connected to, and the selection is received by the processing unit 102 (220). If there is not a single VPN server but multiple identical VPN servers are detected for a selected group, then the processing unit 102 may select a single VPN server among the selected group by means outside of the scope of the present invention but could be by performing an optimization algorithm based on service criteria, choosing a random server, or by any other selective means (222). The selected server's IP address is retrieved from the server database 103 (223) and is sent to the client application 111 as a means to connect to the selected VPN server (224-226).

The following are preferred embodiments for indexing the VPN server list and creating grouping payloads. A grouping payload comprises three interrelated parts or arrays: {"servers": [ . . . ], "locations": [ . . . ], "groups": [ . . . ]}

The "locations" array contains objects that encode information about countries/cities where VPN servers are located. The variable ID uniquely identifies each location. The remaining variables encode convenient data, such as:

"name", appropriate for displaying in user interface (UI) implementations, e.g., in the format "Country Name—City Name".

"country_name" property contains the name of the country where the server is considered to be located (appropriate for use in UI).

"city_name" property contains the name of the city where the server is considered to be located (often nearest major city) (appropriate for use in UI).

"iso_code" containing the ISO 3166 alpha 2 country code for the country where the VPN servers are located.

"coordinates" property contains an object with latitude and longitude properties of the approximate location of the servers.

An example of the "location" array is:

{"ID": 5, "name": "Switzerland - Zürich", "country_name": "Switzerland", "city_name": "Zürich", "iso_code": "ch", "coordinates": {"latitude": 47.367, "longitude": 8.55}}

The "locations" array can be augmented with any additional metadata if needed.

The "group" arrays identify how servers are grouped together. These can be designated from the returned service attributes of VPN servers or arbitrarily. Additionally, users may opt to support some groups and not others based on the metadata provided herein.

An example of a "group" array:
{"ID": 1, "name": "Free", "code": "free", "servers": [1,2,3]}

The variable "ID" uniquely identifies the group. Another unique identifier is the string "code" property, however, unlike the ID property, code is guaranteed to remain stable and is appropriate to use hard coded into applications. The "name" property can be used directly in the user interface.

Lastly, the "servers" array contains IDs of servers that are members of a group. One server can be a member of many groups; however, it will always be a member of at least one group; otherwise, it is not returned in the JSON or any other type of payload.

Similarly, to "locations", the "group" array can be extended with any additional metadata if needed. These metadata can be applied to all or some groups. The "servers" array represents something that the user can connect to and can be used as a distinct object in the UI of client application.

An example of a "server" record is: {"ID": 1, "location_id": 5}

The "ID" here is cross-referenced in the group objects described above, and it acts as a bridge relating locations and groups. This object can be interpreted as a unique combination between a set of groups and one location. However, as far as the user is concerned, it represents an option to connect to something.

Figure 3:
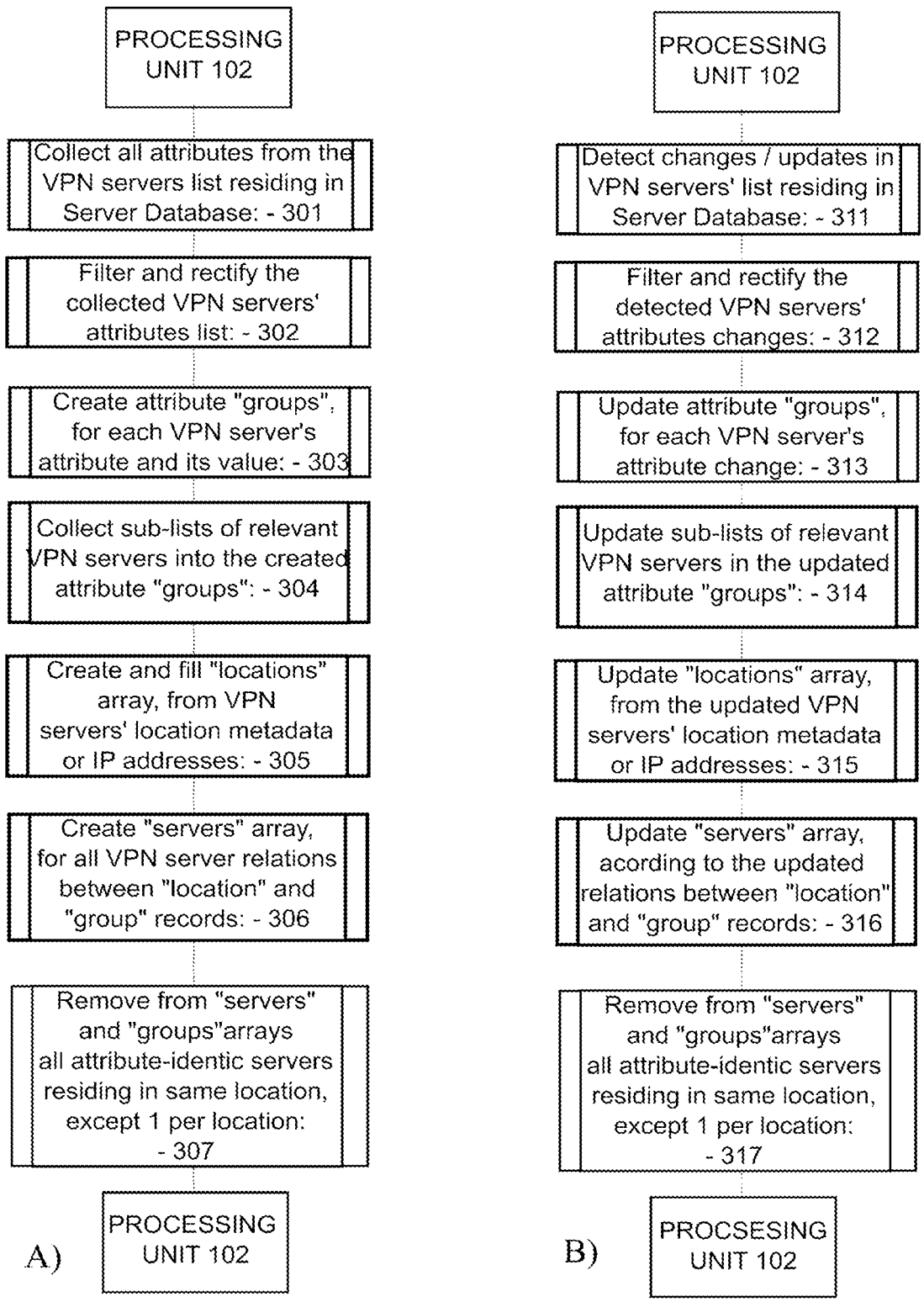
FIG. 3 is a flowchart for grouping and re-grouping VPN servers from the VPN servers' list: A) is a flowchart with steps 301-307 for the initial grouping of a plurality of VPN servers; B) is a flowchart with steps 311-317 for updating the groups, upon changes in the actual VPN servers' list.

The steps described above are further exemplified in the flowchart provided in FIGS. 3A and B. FIG. 3A presents a flowchart of initial grouping of VPN servers from the initial list, and FIG. 3B presents a flowchart of periodic updates of the groups upon changes of VPN servers in the indexed VPN server list. Exemplary embodiments of the method described in FIG. 3 are shown in the examples below for server pools having different locations and attributes.

Example 1

FIG. 4A presents a grouping example of a plurality of eight VPN servers and the corresponding JSON payload. There are eight physical servers in the infrastructure (P1 through P8). All of them are "Free" and all have "Load Capacity of <10 Mbps". The servers are situated in three different locations (A, B, and C). The example metadata in JSON payload is described as:

```
{"servers": [ {"id": 1, "location_id": 1}, {"id": 2, "location_id": 2},
{"id": 3, "location_id": 3}],
"locations": [ {"id": 1, "name": "A"}, {"id": 2, "name": "B"},
{"id": 3, "name": "C"}],
"groups": [
    {"id": 1, "code": "free", "name": "Free", "servers": [1,2,3]},
    {"id": 2,"code": "<10Mbps", "name": "Load Capacity <10Mbps",
    "servers": [1,2,3]}] }
```

There are two groups formed by the available attributes, and there are only three servers represented in the payload instead of the eight physical servers available. The explanation is that it is not necessary for the client application to have knowledge of all physical servers available. This reduction of servers list provides an additional flexibility for infrastructure teams managing VPN servers to reduce the bandwidth of providing full lists of available servers and prevents malicious actors from gathering knowledge of the number and parameters of available servers.

Example 2

FIG. 4B presents a heterogeneous VPN server pool. The same eight servers are available in the same three locations, but an additional attribute is introduced—VPN protocol type L2TP/IPSec. The JSON payload for this case is:

```
{"servers": [ {"id": 1, "location_id": 1}, {"id": 2, "location_id": 2}
{"id": 3, "location_id": 3}, {"id": 4, "location_id": 1}, {"id": 5,
"location_id": 2}],
"locations": [ {"id": 1, "name": "A"}, {"id": 2, "name": "B"},
{"id": 3, "name": "C"}],
"groups": [
    {"id": 1, "code": "free", "name": "Free", "servers": [1,2,3,4,5]},
    {"id": 2, "code": "<10Mbps", "name": "Load Capacity<10Mbps",
    "servers": [1,2,3]},
    {"id": 3, "code": "l2tp/ipsec ", "name": "L2TP/IPSec", "servers":
    [4,5]}]}
```

The "location" payload does not change. The "group" payload introduces an additional group labeled L2TP/IPSec. Two new servers in the "servers" payload are introduced to represent servers in locations A and B that have specific protocol L2TP/IPSec. Note, that the "Free" group still has both of these servers.

Example 3

Another example of a heterogeneous VPN server pool is shown in FIG. 4C: the server P8 in location C has been re-classified for "Load capacity>10 Mbps". The corresponding JSON payload is:

```
{"servers": [ {"id": 1, "location_id": 1}, {"id": 2, "location_id": 2},
{"id": 3, "location_id": 3}, {"id": 4, "location_id": 1}, {"id": 5,
"location_id": 2}],
"locations": [ {"id": 1, "name": "A"}, {"id": 2, "name": "B"},
{"id": 3, "name": "C"}],
"groups": [
    {"id": 1, "code": "free", "name": "Free", "servers": [1,2,3,4,5]},
    {"id": 2, "code": "<10Mbps", "name": "Load Capacity<10Mbps",
    "servers": [1,2]},
    {"id": 3, "code": "ipsec", "name": "IPSec", "servers": [4,5]},
    {"id": 4, "code": ">10Mbps", "name": "Load Capacity>10Mbps",
    "servers": [3]}]}
```

In the "groups" array, the "Free" group has not changed as all of the servers are still Free. "Load Capacity<10 Mbps" servers are available in locations A and B thus the group now contains servers with identifiers 1 and 2 but no longer 3. The "IPSec" group did not change as well. Finally, the "Load Capacity>10 Mbps" group now contains server 3, which is correctly matched with location C. Most notably, there were no reasons to change any contents of the servers or locations contents in the payload.

Example 4

FIG. 4D presents a disjunct VPN server pool. In previous examples, "Free" was the unifying factor for all eight servers. Now, servers P2, P3, P4, P6, P7 acquired "Premium" feature:

```
{"servers": [ {"id": 1, "location_id": 1}, {"id": 2, "location_id": 1},
{"id": 3, "location_id": 1}, {"id": 4, "location_id": 1},
{"id": 5, "location_id": 2}, {"id": 6, "location_id": 2},
{"id": 7, "location_id": 2}, {"id": 8, "location_id": 3} ],
"locations": [ {"id": 1, "name": "A"}, {"id": 2, "name": "B"},
{"id": 3, "name": "C"}],
"groups": [
    {"id": 1, "code": "<10Mbps", "name": "Load Capacity<10Mbps",
    "servers": [1,2,4,5,6,7]},
    {"id": 2, "code": "ipsec", "name": "IPSec", "servers": [3,4,6]},
    {"id": 3, "code": ">10Mbps ", "name": "Load Capacity>10Mbps",
    "servers": [3,8]},
    {"id": 4, "code": "free", "name": "IPSec", "servers": [1,5,8]},
    {"id": 5, "code": "premium", "name": "Premium",
    "servers": [2,3,4,6,7]}]}
```

This results in the largest payload because each and every one of the physical servers has to be represented by an entry in the "servers" array. The server entry is a unique combination of its groups and its location. In this case, there are not two or more servers that share these properties, and each VPN server is represented by its own entry. In this case, the amount of data transferred as an indexed information list remains large. As before, each of the servers is assigned to one of the three available locations. The total number of groups is five. The groups are used to represent different dimensions (in this case, VPN service attributes). The preferred embodiment of the method in the abstract is to assign physical servers to groups by setting up dimensions and assigning each of the servers to a specific place in that dimension.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc.

Figure 5:
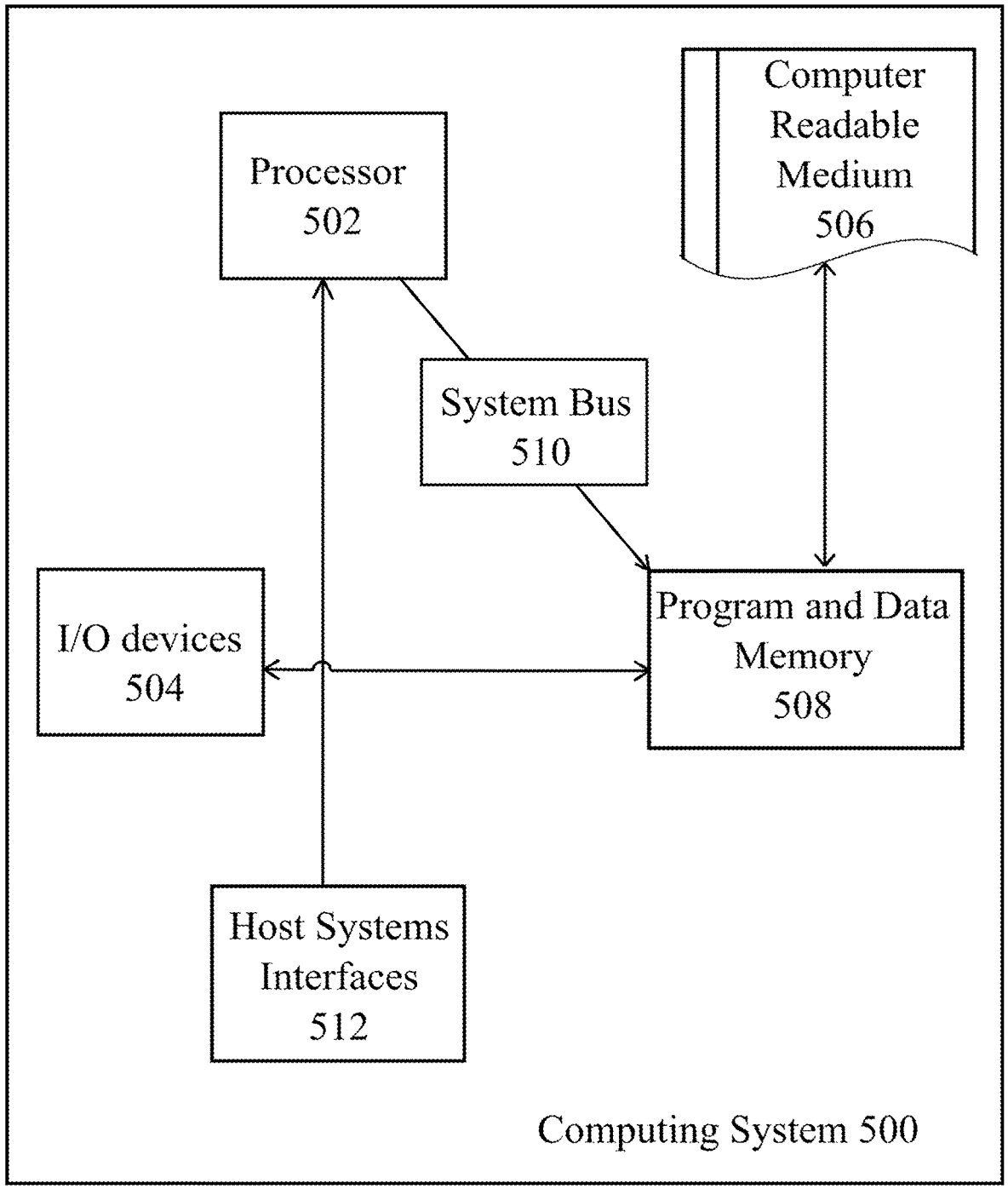
FIG. 5 shows a computing system in which a computer readable medium provides instructions for performing the methods and processes disclosed herein.

Furthermore, some aspects of the embodiments herein can take the form of a computer program product accessible from a computer readable medium to provide program code for use by or in connection with a computer or any instruction execution system. FIG. 5 illustrates a computing system 500 in which the computer readable medium 506 provides instruction for performing any methods and processes disclosed herein. For the purposes of this description, the computer readable medium 506 can be any apparatus that can tangibly store the program code for use by or in connection with the instruction execution system, apparatus, or device, including the computing system 500.

The computer readable medium 506 can be any tangible electronic, magnetic, optical, electromagnetic, infrared, or semiconductor system (or apparatus or device). Some examples of a computer readable medium 506 include solid-state memories, magnetic tapes, removable computer diskettes, random access memories (RAM), read-only memories (ROM), magnetic disks, and optical disks. Some examples of optical disks include read only compact disks (CD-ROM), read/write compact disks (CD-RAN), and digital versatile disks (DVD).

The computing system 500 can include one or more processors 502 coupled directly or indirectly to memory 508 through a system bus 510. The memory 508 can include local memory employed during actual execution of the program code, bulk storage, and/or cache memories, which provide temporary storage of at least some of the program code in order to reduce the number of times the code is retrieved from bulk storage during execution.

Input/output (I/O) devices 504 including but not limited to keyboards, displays, pointing devices, I/O interfaces, etc. can be coupled to the computing system 500 either directly or through intervening I/O controllers. Network adapters may also be coupled to the computing system 500 to enable the computing system 500 to couple to other data processing systems, such as through host systems interfaces 512, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims.

The invention claimed is:

1. A method for providing indexed information about Virtual Private Network servers and establishing a VPN connection to a server having service attributes related to a selected user activity type and server location, wherein the method is performed by a VPN service provider infrastructure, wherein the VPN service provider infrastructure comprises at least an application programming interface (API), a processing unit, and a server database;
comprising:
collecting a list of data pertaining to a plurality of VPN servers and indexing the list of data pertaining to the plurality of VPN servers;
receiving the selected user activity type, at the API from a VPN client application, wherein a user activity type is a set of pre-defined service attributes;
receiving the selected server location, at the API from a VPN client application; providing a list of VPN servers having one or more of the pre-defined service
attributes of the selected user activity type and selected server location of one or more available VPN servers to the VPN client application; wherein the number of available servers and IP addresses of available VPN servers is not provided to the user device;
returning a set of selection criteria related to one or more available VPN servers, from the VPN client application to the processing unit;
selecting one of the one or more available VPN servers having the set of selection criteria;
providing the IP address of the selected VPN server to the VPN client application; and
connecting the VPN client application to the selected server.

2. The method of claim 1, wherein the server database collects and indexes servers by the steps:
collecting a list of and data pertaining to a plurality of VPN servers; wherein the data pertaining to VPN servers comprises IP address, location, and service attributes;
aggregating and indexing the VPN servers' data into the server database;
indexing VPN servers' data in the at least one processor according to a VPN server's service attributes and location; and
grouping VPN servers according to the pre-defined service attributes of the user activity type and only available VPN servers are counted in the groups; wherein available servers are those servers which are capable of servicing a VPN connection.

3. The method of claim 1, wherein the VPN client application is installed locally or remotely on a user device.

4. The method of claim 1 wherein returning a set of selection criteria related to one or more available VPN servers comprises:
requesting to retrieve a VPN server having selected criteria values of the user activity type, by the VPN client application to the API; and
receiving, by the VPN service provider infrastructure, the request with the selected criteria values.

5. The method of claim 1, wherein each VPN server in the plurality of VPN servers is specified by its IP address, location, and a list of VPN service attributes wherein said list comprises at least one VPN service attribute.

6. The method of claim 4, wherein each VPN server in the plurality of VPN servers is assigned a virtual identifier based on its VPN service attributes.

7. The method of claim 1, wherein each VPN server from the plurality of VPN servers is grouped, according to the list of VPN service attributes, wherein each formed group comprises VPN servers having the same service attribute.

8. The method of claim 1, wherein service attributes for grouping of the VPN servers comprises service attributes related to the user activity type such that the service attributes are optimized for the user activity type.

9. A system for providing indexed information about Virtual Private Network servers and establishing a VPN connection to a server having service attributes related to a selected user activity type and server location, comprising:
   A plurality of VPN servers, at least one server probe, a VPN client application, a network, and a VPN service provider infrastructure, wherein the VPN service provider infrastructure further comprises an application programming interface (API), at least one processor, at least one memory device communicably coupled to the at least one processor, and logic encoded in one or more non-transitory computer readable medium for execution by the at least one processor and when executed operable to:
   collect a list of data pertaining to a plurality of VPN servers and index the list of data pertaining to the plurality of VPN servers;
   receive the selected user activity type, at the API from a VPN client application, wherein a user activity type is a set of pre-defined service attributes;
   receive the selected server location, at the API from a VPN client application; provide a list of VPN servers having one or more of the pre-defined service attributes of the selected user activity type and selected server location of one or more available VPN servers to the VPN client application; wherein the number of available servers and IP addresses of available VPN servers is not provided to the user device;
   return a set of selection criteria related to one or more available VPN servers, from the VPN client application to the processing unit;
   select one of the one or more available VPN servers having the set of selection criteria;
   provide the IP address of the selected VPN server to the VPN client application; and
   connect the VPN client application to the selected server.

10. The system of claim 9, wherein the server database collects and indexes servers by the following logic encoded in one or more non-transitory computer readable medium for execution by the at least one processor and when executed operable to:
   collect a list of and data pertaining to a plurality of VPN servers; wherein the data pertaining to VPN servers comprises IP address, location, and service attributes;
   aggregate and index the VPN servers' data into the server database;
   index VPN servers' data in the at least one processor according to a VPN server's service attributes and location; and
   group VPN servers according to the pre-defined service attributes of the user activity type and count only available VPN servers in the groups; wherein available servers are those servers which are capable of servicing a VPN connection.

11. The system of claim 9, wherein the VPN client application is installed locally or remotely on a user device.

12. The system of claim 9, wherein service attributes for grouping of the VPN servers comprises service attributes related to the user activity type such that the service attributes are optimized for the user activity type.

13. The system of claim 9, wherein the at least one server probe collects a payload of VPN server data from each of the plurality of VPN servers.

14. The system of claim 9, wherein the VPN server payload transmitted between the at least one server probe and VPN service provider infrastructure is a machine-readable, structured data payload.

15. The method of claim 9, wherein the list of selection criteria of the VPN servers between VPN infrastructure and API is a tagged data payload.

16. A computer program product for providing indexed information about Virtual Private Network servers and establishing a VPN connection to a server having service attributes related to a selected user activity type and server location, said computer program product being tangibly embodied on a non-transitory computer-readable medium and including executable code that, when executed, is configured to cause a data processing apparatus to:
   collect a list of data pertaining to a plurality of VPN servers and index the list of data pertaining to the plurality of VPN servers;
   receive the selected user activity type, at the API from a VPN client application, wherein a user activity type is a set of pre-defined service attributes;
   receive the selected server location, at the API from a VPN client application; provide a list of VPN servers having one or more of the pre-defined service attributes of the selected user activity type and selected server location of one or more available VPN servers to the VPN client application; wherein the number of available servers and IP addresses of available VPN servers is not provided to the user device;
   return a set of selection criteria related to one or more available VPN servers, from the VPN client application to the processing unit;
   select one of the one or more available VPN servers having the set of selection criteria;
   provide the IP address of the selected VPN server to the VPN client application; and
   connect the VPN client application to the selected server.

17. The computer program product of claim 16, wherein the server database collects and indexes servers by the following logic encoded in one or more tangible media for execution by the at least one processor and when executed operable to:
   collect a list of and data pertaining to a plurality of VPN servers; wherein the data pertaining to VPN servers comprises IP address, location, and service attributes;
   aggregate and index the VPN servers' data into the server database;
   index VPN servers' data in the at least one processor according to a VPN server's service attributes and location; and
   group VPN servers according to the pre-defined service attributes of the user activity type and count only available VPN servers in the groups; wherein available servers are those servers which are capable of servicing a VPN connection.

18. The computer program product of claim 16, wherein the VPN client application is installed locally or remotely on a user device.

19. The computer program product of claim 16, wherein service attributes for grouping of the VPN servers comprises service attributes related to the user activity type such that the service attributes are optimized for the user activity type.

20. The computer program product of claim 16, wherein each VPN server in the plurality of VPN servers is specified by its IP address, location, and a list of VPN service attributes, wherein said list comprises at least one VPN service attribute.

* * * * *